(12) United States Patent
Bright et al.

(10) Patent No.: US 11,958,491 B2
(45) Date of Patent: Apr. 16, 2024

(54) TARGET VEHICLE FOR ADAS TESTING

(71) Applicant: Anthony Best Dynamics Ltd., Wiltshire (GB)

(72) Inventors: William Bright, Trowbridge (GB); Colin Martin, Bath (GB); Gabriele Cocco, Corsham (GB); Andrew Pick, Bradford on Avon (GB)

(73) Assignee: Anthony Best Dynamics Ltd., Wiltshire (GB)

( * ) Notice: Subject to any disclaimer, the term of this patent is extended or adjusted under 35 U.S.C. 154(b) by 44 days.

(21) Appl. No.: 17/206,760

(22) Filed: Mar. 19, 2021

(65) Prior Publication Data
US 2021/0291850 A1 Sep. 23, 2021

(30) Foreign Application Priority Data
Mar. 20, 2020 (GB) .................................... 2004079

(51) Int. Cl.
*B60W 50/04* (2006.01)
*B60W 40/12* (2012.01)
(Continued)

(52) U.S. Cl.
CPC .......... *B60W 50/045* (2013.01); *B60W 40/12* (2013.01); *G01M 17/00* (2013.01);
(Continued)

(58) Field of Classification Search
None
See application file for complete search history.

(56) References Cited

U.S. PATENT DOCUMENTS 8,781,684 B2 7/2014 Bruce
2005/0187641 A1* 8/2005 Robbins ................. G05B 17/02
700/1

(Continued)

FOREIGN PATENT DOCUMENTS

JP 6165857 B2 7/2017
WO 2019243838 A2 12/2019
WO 2020254010 A1 12/2020

OTHER PUBLICATIONS

Great Britain Search Report issued in Great Britain Application No. 2004079.6, dated Dec. 9, 2020, 2 pages.
(Continued)

*Primary Examiner* — Aniss Chad
*Assistant Examiner* — Mahmoud M Kazimi
(74) *Attorney, Agent, or Firm* — Sterne, Kessler, Goldstein & Fox P.L.L.C.

(57) ABSTRACT

A target vehicle, for example a two-wheeled vehicle, for mounting onto an ADAS (Advanced Driver Assistance System) testing platform is provided. The target vehicle comprises one or more sensors and an actuation assembly comprising an actuator. The sensors are arranged to measure a parameter relating to the dynamics of the target vehicle and may for example comprise accelerometers. The actuation assembly adjusts the tilt of the target vehicle in dependence on the output of the sensor(s), for example by means of a control unit. The tilting of the vehicle during cornering may thus be simulated. The measuring of such a parameter and the adjusting of the tilt may be conducted remotely from the testing platform. The sensor(s), control unit and actuator assembly may be self-contained within the target vehicle. A method of modeling a VRU (Vulnerable Road User) for ADAS testing is also provided.

17 Claims, 9 Drawing Sheets

(51) Int. Cl.
    *B60W 50/00*      (2006.01)
    *G01M 17/00*     (2006.01)

(52) U.S. Cl.
    CPC ............... *B60W 2050/0033* (2013.01); *B60W 2520/125* (2013.01)

(56) References Cited

U.S. PATENT DOCUMENTS

| | | | | |
|---|---|---|---|---|
| 2014/0019006 | A1* | 1/2014 | Bruce | B60W 30/18145 |
| | | | | 701/41 |
| 2018/0208259 | A1* | 7/2018 | van Wijk | B62D 9/02 |
| 2022/0101755 | A1* | 3/2022 | Hafellner | G09B 23/30 |

OTHER PUBLICATIONS

AB Dynamics; "AB Dynamics demonstrates a driverless motorcycle"; dated Apr. 11, 2018; URL: https://www.abdynamics.com/en/news/2018/ab-dynamics-demonstrates-a-driverless-motorcycle, the whole document.

AB Dynamics; "Driverless Motorbike"; dated Apr. 11, 2018; YouTube; URL: https://www.youtube.com/watch?v=1KUym9amXpc, the whole video.

Thomas Wimmer; "Deliverable 2.1 Motorcyclist Target Specifications"; Motorbike Users Safety Enhancement; pp. 1-30; URL: https://www.utacceram.com/images/utac/metiers/muse/reports/d2-I-motorcyclist-target-specifications.pdf, Section 2.

PROactive Safety for PEdestrians and Cyclists Project Information at https://cordis.europa.eu/project/id/634149/results; Prospect Grant agreement ID: 634149; 10 pages; Last accessed on Aug. 31, 2021.

\* cited by examiner

TARGET VEHICLE FOR ADAS TESTING

CROSS-REFERENCE TO RELATED APPLICATION

The present application claims priority to GB Application No. 2004079.6, filed on Mar. 20, 2020, which is incorporated herein by reference in its entirety.

FIELD

The present invention concerns targets for use in Advanced Driver Assistance Systems (ADAS) testing. More particularly, but not exclusively, this invention concerns a target vehicle for use on an ADAS testing platform, and to methods of tilting such a target vehicle.

BACKGROUND

Many modern vehicles now include Advanced Driver Assistance Systems (ADAS) for increasing vehicle safety. To test ADAS in vehicles, it is desirable to replicate real-world scenarios in a consistently repeatable manner, and to measure how the ADAS reacts.

To replicate these real-world scenarios, it is known to use a target assembly (also sometimes known as a Guided Soft Target (GST)) comprising a low-profile testing platform onto which a target vehicle is mounted. The testing platform typically follows a predetermined path (dependent on the scenario being modeled). The testing platform carries a target vehicle that replicates the appearance of a road vehicle, but is made of a soft material to minimize any damage to the vehicle being tested in the event of a collision.

As well as modeling road vehicles such as cars, it is also necessary to model what are often known as a Vulnerable Road Users (VRUs). VRUs typically include pedestrians, cyclists and motorcyclists.

In the real-world scenario, cyclists, motorcyclists and other single track vehicles, tend to experience relatively complex dynamics, especially during cornering. In particular, such VRUs tend to need to tilt over (e.g., lean), when cornering. It is desirable to replicate this real-world scenario as accurately as possible.

BRIEF SUMMARY

According to a first aspect of the invention, there is provided a target assembly comprising a testing platform and a target vehicle mounted thereon. The target assembly comprises: a sensor arranged to measure a parameter relating to the dynamics of the target assembly; and an actuation assembly arranged to adjust the tilt of the target vehicle in dependence on the output of the sensor. By providing a sensor to sense the dynamics of the target assembly, the target vehicle may be tilted in dependence on those dynamics. In some embodiments of the invention, the sensor is in the testing platform. In these embodiments, the target assembly may comprise a communication module for communicating signals between the platform and the target vehicle. The signals communicated by the communications module may comprise signals for actuating the actuation assembly of the target vehicle. In embodiments in which the sensor is in the testing platform, the sensor is also be used for other purposes. For example, the sensor may be a sensor that is used for controlling of the platform. Such an arrangement may be beneficial because it recognizes that the output of a sensor (for example a pre-existing sensor in the testing platform) may also be used when effecting the tilt of the target vehicle.

According to a second aspect, the present invention provides a target vehicle for mounting onto an ADAS testing platform. The target vehicle comprises: a sensor arranged to measure a parameter relating to the dynamics of the target vehicle; and an actuation assembly arranged to adjust the tilt of the target vehicle in dependence on the output of the sensor. It has been recognized that by measuring the parameter relating to the dynamics of the target vehicle, the tilt of the vehicle may be adjusted to more accurately model the real-world behavior of such a vehicle. In some embodiments, such a measurement of the parameter relating to the dynamics of the vehicle may be obtainable from a sensor in the testing platform (a testing platform typically already has a plurality of sensors from which this measurement may be derived). However, preferred embodiments of the invention recognize that by providing a sensor on the target vehicle, the target vehicle may then be configured to provide this functionality independently of the testing platform. In other words, the testing vehicle may be largely self-contained and may be arranged to tilt during cornering regardless of the platform on which it is mounted. Such an arrangement is beneficial because it avoids the need for communication or other interfacing between the testing platform and the target vehicle.

The target vehicle may be a Vulnerable Road User (VRU) target vehicle. The target vehicle may be replicating a single track vehicle, preferably a two-wheeled vehicle. The target vehicle may be replicating a bicycle or a motorbike.

The target vehicle of the second aspect is suitable for mounting onto an ADAS testing platform, but does not include the testing platform itself. The target vehicle may be remote from a testing platform. The sensor and the actuation assembly may be arranged to function independently of the testing platform onto which the target vehicle may be mounted. The sensor is not part of the testing platform. The target vehicle may comprise feet for detachably mounting to the testing platform. The target vehicle may comprise no means of self-propulsion. The target vehicle is, for example, a model with no means of its own propulsion.

The target vehicle may further comprise a control unit configured to control the actuation assembly. The control unit may be configured to adopt a simulation tilt angle. The magnitude of the simulation tilt angle may be dependent on the output of the sensor. Providing a control unit on the target vehicle further ensures the functionality of the target vehicle is self-contained and may be independent of the testing platform.

It will be appreciated that that the value of the simulation tilt angle is preferably variable and not a fixed value. The simulation tilt angle may be the tilt angle suitable for modeling the real-world tilt that would be experienced by the target vehicle. The simulation tilt angle may, at any one time, therefore depend on, for example, the radius of the turn and the speed at which the target vehicle is travelling. The simulation tilt angle may be a target angle.

The tilt angle will be understood to be the angle at which the target vehicle tilts away from the absolute vertical (i.e. the direction in which gravity acts). This may also be referred to as the lean angle. The angle is typically measured between the absolute vertical direction and the plane in which the diameter of the target vehicle's wheels lie.

Embodiments of the present invention seek to replicate the real-word tilt angle as closely as possible. When riding a two-wheeled vehicle such as a motorbike, the rider naturally seeks to adjust the center of mass (of the bike and rider) to counteract other forces that may otherwise create an overturning moment. These forces may be due to a number of factors such as the slope/camber of the surface being traversed, or external forces such as the wind. A common scenario encountered is during cornering of a two-wheeled vehicle such as a motorbike, where the rider naturally seeks to adjust the center of mass (of the bike and rider) to counteract the overturning moment exerted on the target vehicle during movement around the corner. The rider seeks to ensure that the resultant force from cornering and from gravity is directed through the plane of the wheels and the tilting axis. In preferred embodiments of the invention, the simulation tilt angle is the tilt angle necessary to counteract the overturning moment exerted on the target vehicle. The simulation tilt angle may be the tilt angle necessary to counteract the overturning moment exerted on the target vehicle during movement of the platform around a corner. Such an arrangement may closely replicate the tilt experienced by a rider performing such a maneuver in the real-world. Furthermore, by arranging the control unit in this way, the target vehicle tends to be responsive to whatever conditions the platform encounters (such as adjusting for road surface changes that may impact on the forces experienced by the target vehicle).

The target vehicle may comprise a base for mounting in a fixed position relative to the platform, and a tiltable body for tilting relative to the base. The target vehicle may comprise a hinge having a hinge axis about which the tiltable portion may rotate. The hinge axis is preferably located such that the hinge axis is proximate the contact patch between the target vehicle's wheels and the ground. When the target vehicle is mounted on the testing platform, the hinge axis may be proximate the platform. The platform is typically low-profile, such that the axis is also proximate the contact patch. Keeping the hinge axis close to the testing platform, seeks to ensure the target vehicle tilts about, or near, the contact patch, and therefore seeks to model the real-world scenario.

The sensor is preferably located on the tiltable body such that the sensor moves during tilting of the target vehicle. Such an arrangement is beneficial because the sensor tends to measure the parameter, as it would be experienced on the vehicle when tilted. This tends to ensure a realistic tilt angle is achieved because it allows the target vehicle to be responsive to whatever conditions the tiltable part of the vehicle is encountering.

The sensor may be an accelerometer. The parameter relating to the dynamics of the target vehicle may be an acceleration. The accelerometer may be arranged to measure lateral acceleration of the target vehicle. The lateral acceleration is the acceleration in the lateral direction. The lateral direction is preferably the lateral direction in the frame of reference of the target vehicle. In the frame of reference of the target vehicle, the lateral direction is perpendicular to the vertical direction when the target vehicle is upright. For example, the lateral direction is preferably horizontal when the target vehicle is upright, but the lateral direction may be inclined (from the horizontal) by the tilt angle when the target vehicle is tilted.

Measuring an acceleration, and preferably the lateral acceleration, has been found to be especially beneficial because it tends to be responsive to whatever conditions the tiltable part of the vehicle is encountering. An accelerometer may also be relatively precise, relative to some other sensors such as spatial sensors (for example a GPS sensor).

In embodiments in which the lateral acceleration is measured, the control unit may be arranged to adjust the tilt in a manner that seeks to keep the measured lateral acceleration at or below a threshold value. The control unit may be arranged to adjust the tilt in a manner that seeks to keep the measured lateral acceleration at a minimum value. Minimal lateral acceleration (for example substantively zero lateral acceleration) is obtained when the resultant force is directed through the hinge axis. This resultant force may be directed through the plane of the wheels. This is also the tilt that a rider of the vehicle would naturally tend to adopt in the real-world scenario.

The actuation assembly may comprise a rotary actuator. Rotation of the rotary actuator preferably effects the tilt of the target vehicle. Using a rotary actuator has been found to facilitate a relatively compact actuator assembly, for example enabling the actuator assembly to be mounted inside the target. This tends to be especially beneficial for a target vehicle because it enables the overall shape/radar signature, of the target vehicle to closely match a corresponding real world vehicle (and therefore ensure accurate ADAS testing).

The actuation assembly may comprise a pinion engaged with a rack. The pinion may be arranged to be driven by the actuator such that rotation of the pinion moves the pinion along the rack to tilt the target vehicle. The rack may be attached to a base portion of the target vehicle. Such an arrangement has been found to facilitate a relatively compact actuator assembly. This may facilitate a relatively accurate radar signature of the target vehicle because there tends to be relatively little structure protruding from the modeled shape of the target.

The rack may be a toothed belt. A belt may be beneficial because it tends not to be readily damaged in collisions. Alternatively or additionally, a belt may be beneficial because it is readily attachable/detachable from a base portion of the target vehicle.

According to a further aspect of the invention, there is provided a two-wheeled target vehicle for mounting onto an ADAS testing platform, the target vehicle being arranged to simulate the tilting of a two-wheeled vehicle during cornering, wherein the target vehicle comprises: a sensor arranged to measure a parameter of the target vehicle dynamics as it is moved by the testing platform; an actuation assembly arranged to adjust the tilt of the target vehicle; a control unit configured to control the actuation assembly to adopt a simulation tilt angle, the magnitude of the simulation tilt angle being dependent on the output of the sensor, wherein the sensor, control unit and actuator assembly are self-contained within the target vehicle and are independent of the platform to which the target vehicle is mounted.

According to a further aspect of the invention, there is provided a target assembly comprising a testing platform onto which the target vehicle of the above-mentioned aspects is mounted.

According to a further aspect of the invention, there is provided an assembly for tilting a target vehicle, the assembly comprising: a sensor for attaching to a target vehicle to measure a parameter relating to the dynamics of the target vehicle; an actuation assembly arranged to adjust the tilt of the target vehicle in dependence on the output of the sensor; and a control unit configured to control the actuation assembly to adopt a simulation tilt angle, the magnitude of the simulation tilt angle being dependent on the output of the sensor.

According to a further aspect of the invention, there is provided a method of modeling a VRU for ADAS testing using a target vehicle mounted on a moveable testing platform, the method comprising the steps of: measuring a parameter relating to the dynamics of the target vehicle; and adjusting the tilt of the target vehicle in dependence on the output of the sensor, wherein the steps of measuring and adjusting are conducted remotely from the testing platform. The steps of measuring and adjusting preferably all take place in the target vehicle. Such a method is beneficial because it enables the target vehicle to be self-contained relative to the testing platform.

It will of course be appreciated that features described in relation to one aspect of the present invention may be incorporated into other aspects of the present invention. For example, the method of the invention may incorporate any of the features described with reference to the apparatus of the invention and vice versa.

BRIEF DESCRIPTION OF THE DRAWINGS/FIGURES

Embodiments of the present invention will now be described by way of example with reference to the accompanying schematic drawings of which.

DETAILED DESCRIPTION

Figure 1:
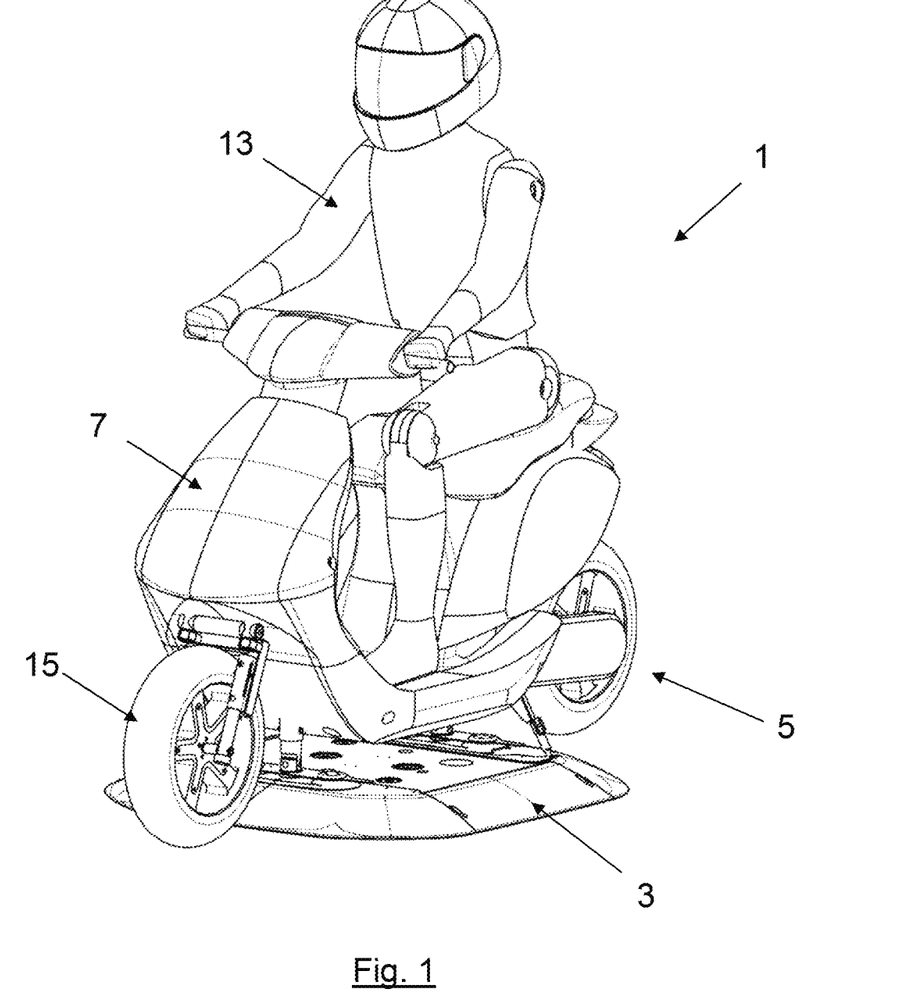
FIG. 1 shows a perspective view of a target assembly incorporating a target vehicle according to a first embodiment of the invention.

FIG. 1 is a perspective view of a target assembly (also referred to as a guided soft target (GST)) 1. The GST 1 comprises a low-profile testing platform 3 onto which is mounted a target vehicle 5 according to a first embodiment of the invention.

In the first embodiment of the invention, the target vehicle 5 is seeking to replicate a moped, which is a type of target often referred to as a vulnerable road user (VRU). The target vehicle 5 comprises a sacrificial soft body 7 (made from close cell polyethylene foam) that closely resembles a real-world moped. The soft body 7 encloses a framework 9 and tilting assembly 11 (discussed in more detail in FIGS. 4 to 6 below). In the first embodiment, a dummy-rider 13 is sat on the target vehicle 5.

Figure 2:
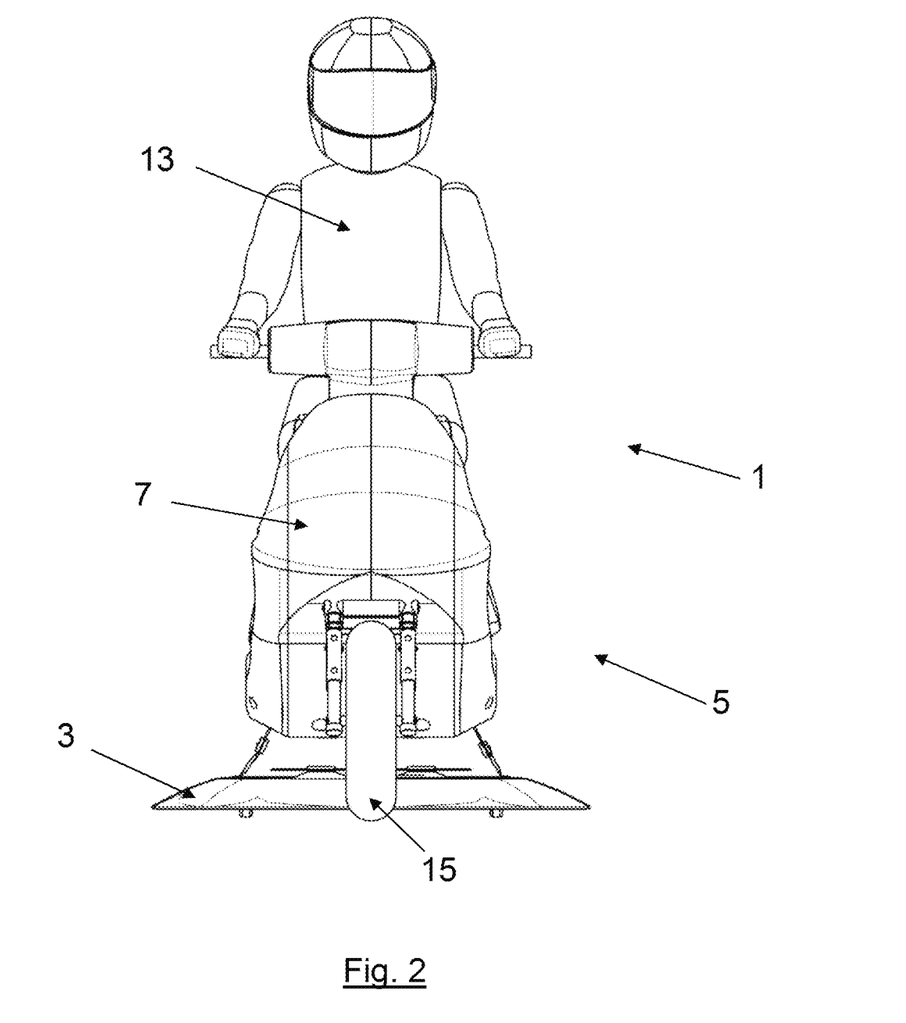
FIGS. 2 and 3 show a frontal view of the target assembly in FIG. 1 when upright and tilting respectively.
Figure 3:
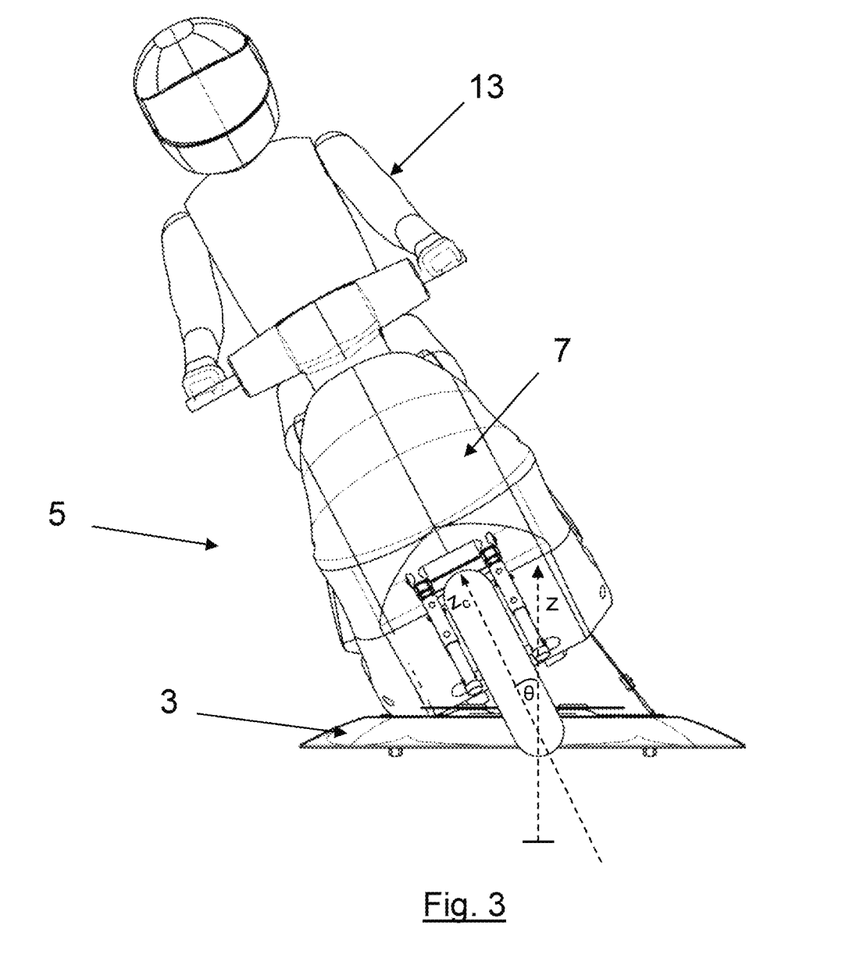

FIGS. 2 and 3 show the GST 1 in frontal view during two different scenarios. In FIG. 2, the testing platform 3 is traversing level ground in a straight line. The moped is therefore upright, with its center of mass above the wheels 15. In FIG. 3, the testing platform 3 is on the same level ground but is traversing a curved path, for example around a corner in a road. In the first embodiment of the invention, the target vehicle 5 is configured so that it tilts (i.e. leans over from the upright direction) as the testing platform 3 traverses the curved path. This ensures the target vehicle 5 closely replicates the real-world movement the moped would exhibit. Features of the target vehicle 5 that enable this functionality will now be described with reference to FIGS. 4 to 7.

Figure 4:
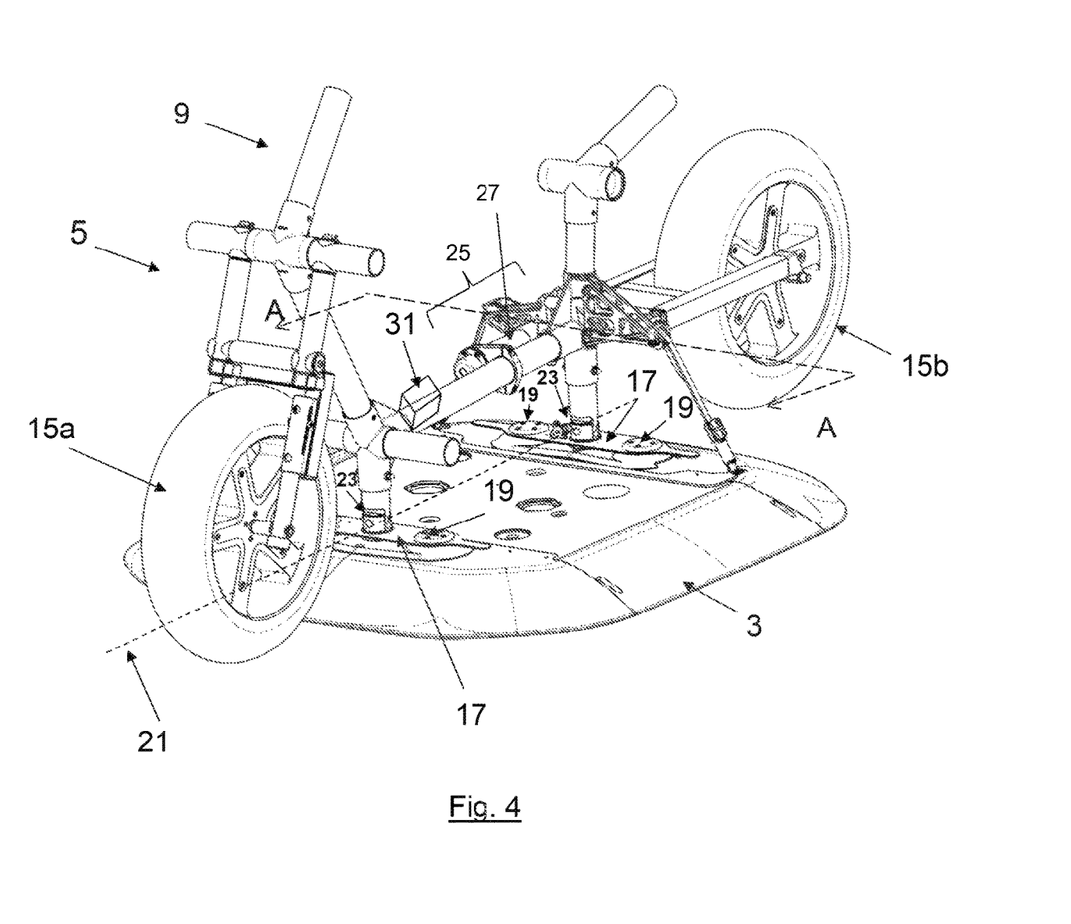
FIG. 4 shows the target vehicle of the first embodiment but with the soft body removed.

Referring initially to FIG. 4, this illustrates the structure of the target vehicle 5 beneath the soft body 7. The structure comprises a framework 9 of tubing onto which the soft body 7 (not shown in FIGS. 4 to 6) would be attached. The tubing connects with front and back wheels 15a, 15b. The structure comprises a base portion 17 having four magnetic fasteners 19 for mounting the target vehicle 5 onto the testing platform 3. The magnetic fasteners 19 allow the target vehicle 5 to readily detach from the testing platform 3 in the event of a collision during ADAS testing.

A hinge axis 21 passes through two co-axial hinges 23, positioned low down on the target vehicle 5, and connecting the base portion 17 to the framework 9 of tubing above. The framework 9 above the base portion 17 is tiltable about the hinges 23 under the action of a tilting assembly 25.

Figure 5:
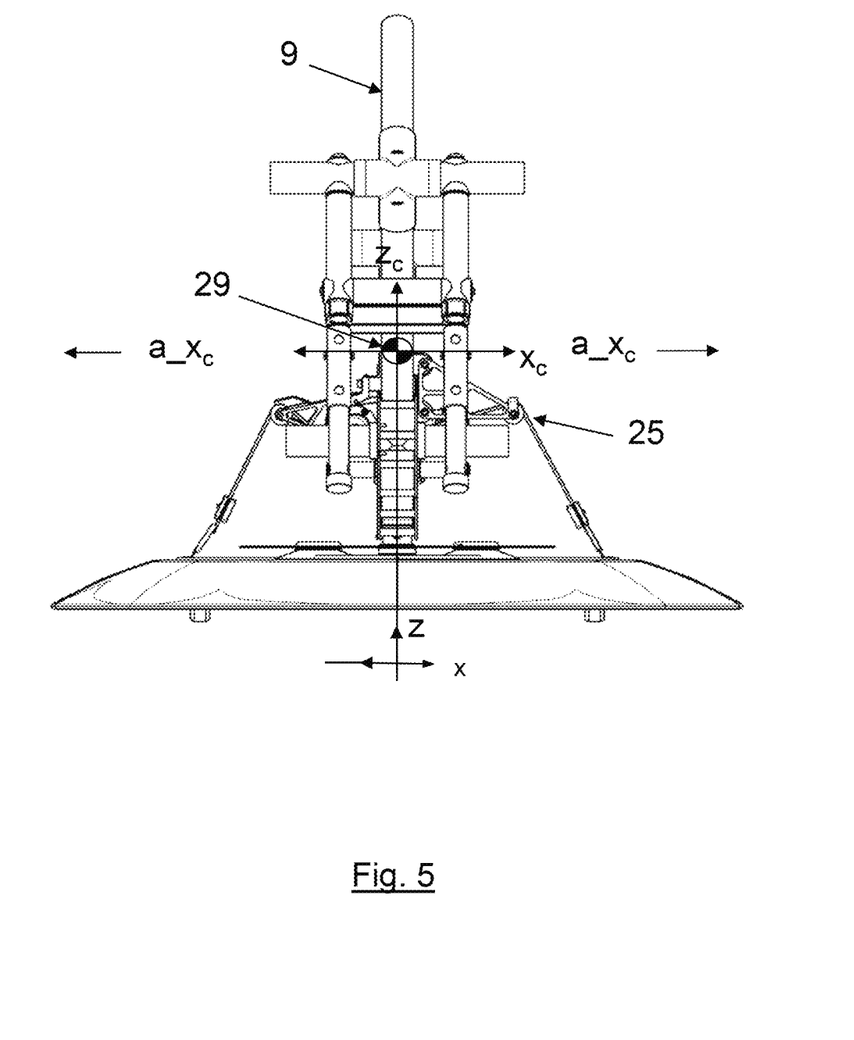
FIGS. 5 and 6 show a frontal view of the target vehicle in FIG. 4 when upright and tilting respectively, but with the tires removed.
Figure 6:
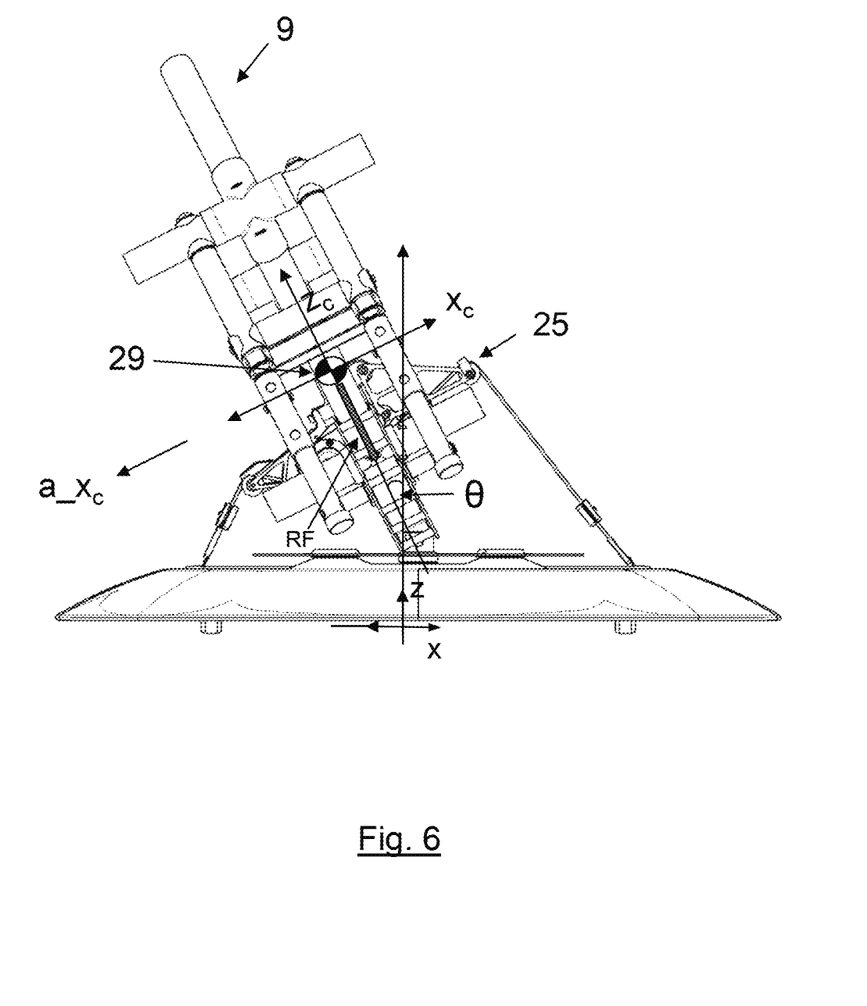
Figure 7:
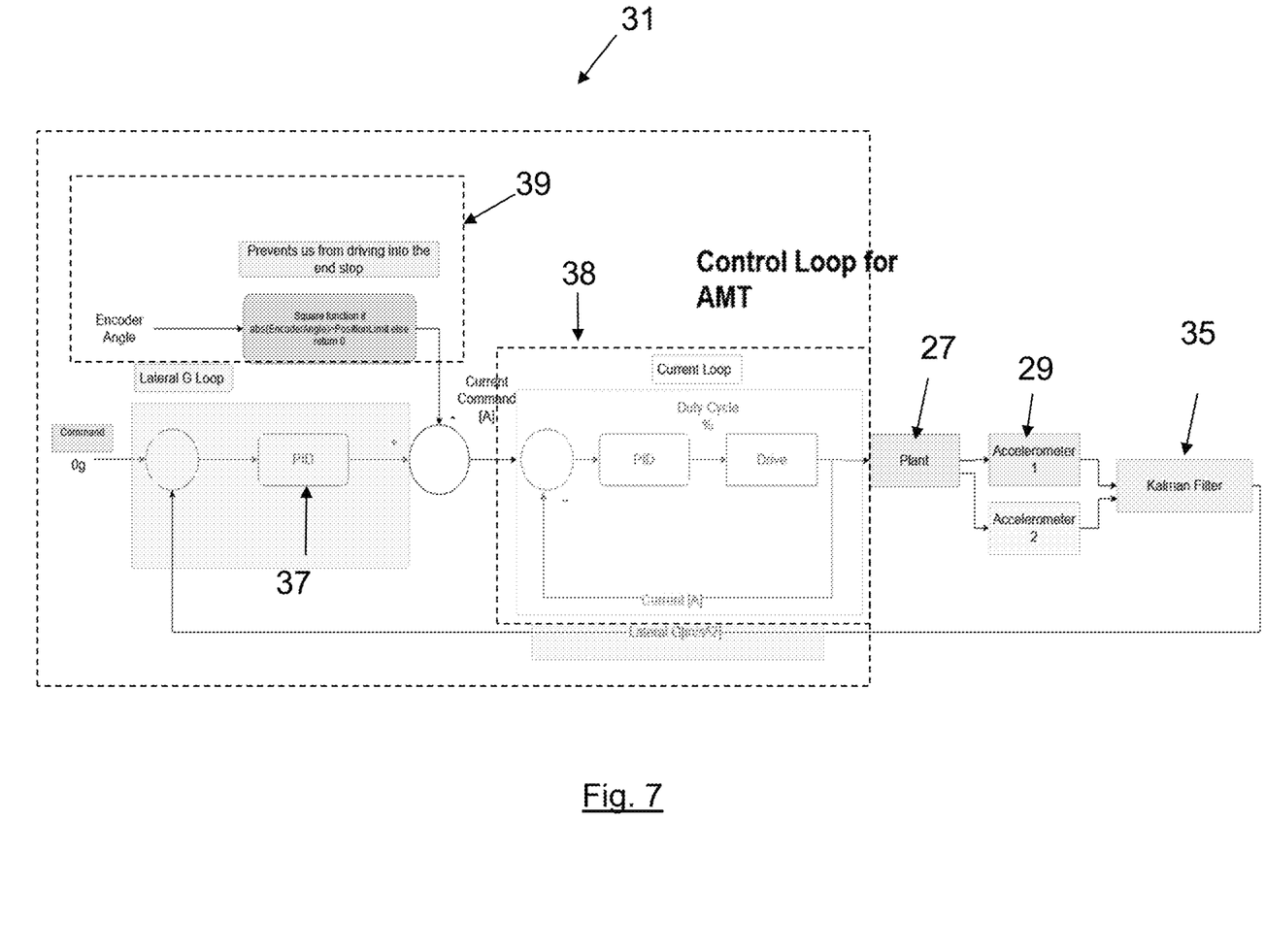
FIG. 7 is a schematic showing the control unit in the target vehicle of the first embodiment.

The tilting assembly 25 comprises an actuator 27, two accelerometers 29, and a control unit 31 (see FIGS. 5-7). The accelerometers 29 and the control unit 31 are located in a housing attached to the framework 9. The accelerometers 29 are shown schematically in FIGS. 5 and 6. The accelerometers 29 are mounted on the framework 9 such that when the target vehicle is upright, the accelerometers 29 lie along the vertical axis in the absolute frame (Z) and the local frame (Zc) relative to the target vehicle. In other embodiments (not shown), the accelerometers 29 may be in a location off from the vertical axis, and the control unit is arranged to compensate for that offset when processing the output from the accelerometers 29.

Each accelerometer 29 is arranged to measure lateral acceleration a_Xc, i.e. acceleration along the lateral direction Xc relative to the target vehicle 5. Two accelerometers 29 are provided to average out any noise in the signal and to average out any offset between the two accelerometers 29. During use, when the target vehicle 5 is mounted on a moving testing platform 3, the output of the accelerometers 29 is fed to the control unit 31. If the testing platform 3 begins to traverse a curved path, the accelerometers 29 will begin to experience an increase in lateral acceleration a_Xc. The control unit 31 is arranged to control the rotary actuator 27 to adjust the tilt of the testing vehicle 5 (e.g., the tilt of the tiltable framework 9 of the testing vehicle 5), such that the lateral acceleration a_Xc is minimized.

The control unit 31 carries out the control process shown in FIG. 7 to which reference is now made. The control unit 31 receives the signals from the accelerometers 29 (via a Kalman filter 35 to reduce signal noise). The control unit 31 also receives a target lateral acceleration threshold of 0 g. A PID controller 37 receives a measure of the difference between this target value and the measured values from the accelerometers 29. The PID 37 provides an output signal, indicative of maintaining the target threshold lateral acceleration of 0 g, and this output signal is sent to the actuator 27 to adjust the tilt in a manner that reduces the lateral acceleration a_Xc to the threshold value. The control unit 31 thus contains a control loop that seeks to maintain a simulation tilt angle $\theta$ of the target vehicle at a value then results in no lateral acceleration being measured by the accelerometers 29.

In the first embodiment of the invention, the control unit 31 also contains an intermediate actuator-protection module 38 for protecting the actuator 27 from excessive electrical currents, although it will be appreciated that this protection module 38 is optional and may not necessarily be required in other embodiments. The control unit 31 also comprises an end-stop control module 39, which is arranged to prevent the actuator 27 assembly driving beyond its end-stop positions. Again, it will be appreciated that this end-stop control module 39 is optional and may not necessarily be required in other embodiments of the invention.

Referring back to FIGS. 5 and 6, these illustrate the accelerometers 29 and other parts of the target vehicle 5 in upright and tilted configurations respectively. As shown in FIG. 6, the lateral acceleration is minimized when the resultant force Rf from cornering and from gravity, is directed along the local vertical axis Zc of the target vehicle (which is the same as the direction through the plane of the wheels). This is the tilt angle θ necessary to counteract the overturning moment exerted on the target vehicle during movement of the platform 3 around the corner, and is therefore an accurate representation of the actual tilt a rider tends to adopt when cornering a moped. In the context of the illustrated embodiment, the tilt angle θ (also referred to as the lean angle) is measured between the vertical axis Zc of the vehicle and the vertical axis Z in the absolute reference frame.

Figure 8:
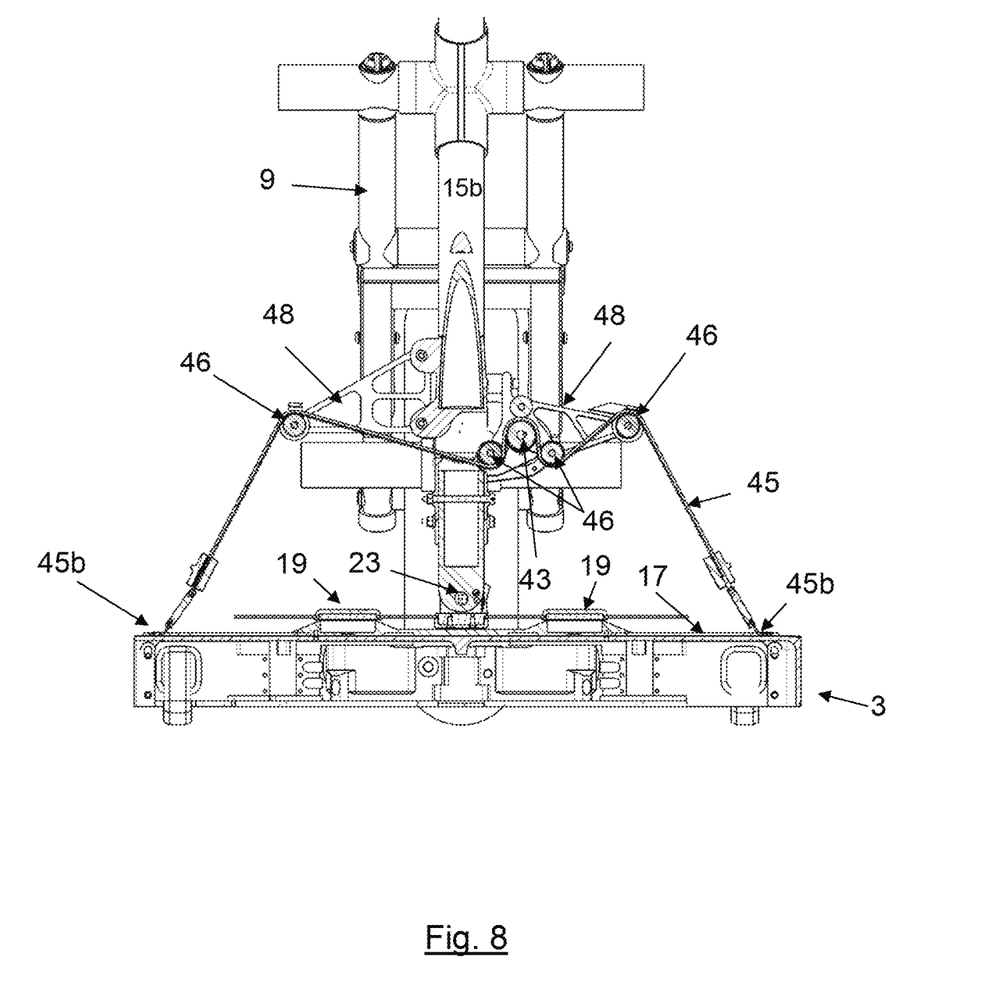
FIGS. 8 and 9 are sectional views through A-A in FIG. 4, showing part of the actuation assembly.
Figure 9:
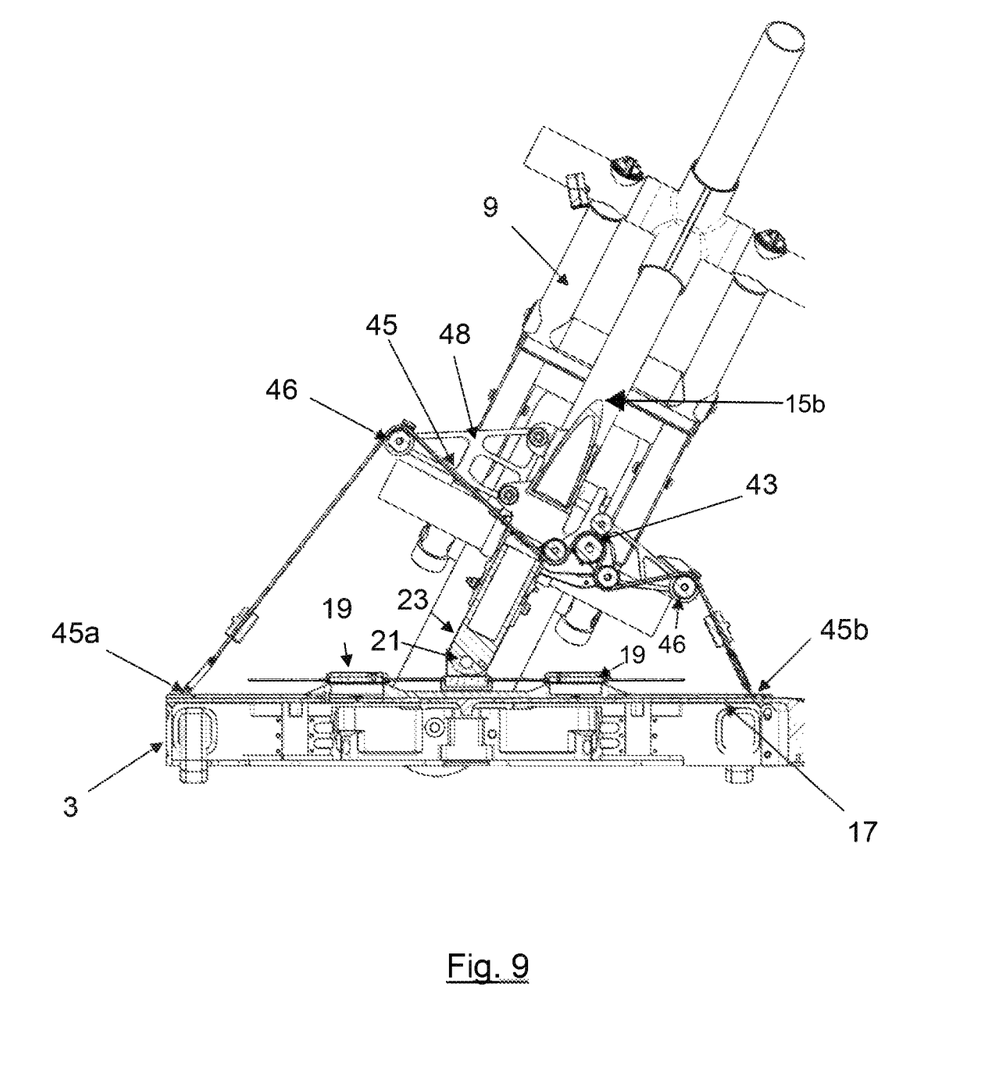

FIGS. 8 and 9 illustrate the actuation assembly 25 in more detail and is a section view along A-A of FIG. 4. The assembly 25 comprises the rotary actuator 27 orientated along the lower part of the frame, and generally along the fore-aft direction (Yc) of the testing vehicle 5. The use of a rotary actuator 27 and its orientation in this manner facilitates a relatively compact arrangement that does not need to protrude from the soft body 7.

A pinion gear 43 is mounted to the output shaft of the rotary actuator 27. The pinion gears 43 mesh with a rack in the form of a toothed belt 45. The toothed belt 45 is fastened at either end 45a, 45b, to the base portion 17 of the target vehicle 5 and runs through idler gears 46 mounted on lateral arms 48. To adjust the tilt of the target vehicle 5, the pinion 43 is rotated, thereby drawing the pinion and the remainder of the tiltable part 9 of the target vehicle 5 along the toothed belt 45 in the direction and magnitude specified by the control unit 31, such that it tilts about the hinge axis 21 of the hinges 23.

The first embodiment of the invention provides several advantages over known VRU target vehicles. Firstly, the equipment necessary to achieve the tilting of the target vehicle is self-contained on the target vehicle. It is independent of the platform on which it is mounted. This enables the target vehicle to be readily used on various different platforms and avoids the need for communication or other interfacing between a platform and the testing vehicle. Secondly, the arrangement used in this embodiment of the invention has been found to provide especially realistic tilt behavior because it measures a real-time parameter that is indicative of the tilt a rider would adopt (e.g., it measures a parameter relating to the dynamics of the vehicle (the lateral acceleration) as it is experienced by the tilting part of the target vehicle). Finally, the actuator assembly in the first embodiment is compact and has a relatively low radar signature outside the soft body of the moped; it is therefore especially beneficial for ADAS testing.

Whilst the present invention has been described and illustrated with reference to a particular embodiment, it will be appreciated by those of ordinary skill in the art that the invention lends itself to many different variations not specifically illustrated herein. By way of example, different sensors may be used. In a further embodiment (not shown), the target vehicle may include a GPS sensor for measuring the spatial movement of the target vehicle. From that measurement of spatial movement, for example from a measurement of the yaw of the target vehicle, the appropriate tilt behavior may be calculated and the actuator assembly instructed accordingly. By way of another example, the target vehicle may be modeling a different single-track VRU such as a push bike (bicycle) or a differently shaped motorbike. In another embodiment of one of the aspects of the invention, the sensor may be a pre-existing sensor on the testing platform that was already used for controlling the testing platform (e.g. a GPS sensor). In this embodiment, a communications module is provided for relaying the output of the sensor and/or the control unit, to the actuation assembly on the target vehicle, to provide a tiling actuation signal.

Where in the foregoing description, integers or elements are mentioned which have known, obvious or foreseeable equivalents, then such equivalents are herein incorporated as if individually set forth. Reference should be made to the claims for determining the true scope of the present invention, which should be construed so as to encompass any such equivalents. It will also be appreciated by the reader that integers or features of the invention that are described as preferable, advantageous, convenient or the like are optional and do not limit the scope of the independent claims. Moreover, it is to be understood that such optional integers or features, whilst of possible benefit in some embodiments of the invention, may not be desirable, and may therefore be absent, in other embodiments.

What is claimed is:

1. A target vehicle to mount onto an Advanced Driver Assistance System (ADAS) testing platform, the target vehicle comprising:
   a base;
   a sensor arranged to measure a parameter relating to dynamics of the target vehicle;
   a tiltable body to tilt relative to the base; and
   an actuation assembly arranged to adjust a tilt of the target vehicle in dependence on an output of the sensor, the actuation assembly comprising:
   a rotary actuator, the rotary actuator being oriented along a fore-aft direction of the target vehicle,
   a pinion driven by the rotary actuator,
   a rack, wherein the rack is a toothed belt, the toothed belt being fastened at either end to the base at respective end fixings, and
   two idler gears mounted on lateral arms extending from the tiltable body,
   wherein the pinion is engaged with the rack, and the rack runs around the two idler gears, such that rotation of the pinion moves the pinion and the two idler gears along the rack, relative to the end fixings,
   to tilt the target vehicle.

2. The target vehicle of claim 1, wherein the target vehicle further comprises:
   a control unit configured to control the actuation assembly to adopt a simulation tilt angle, a magnitude of the simulation tilt angle being dependent on the output of the sensor.

3. The target vehicle of claim 2, wherein the simulation tilt angle is the tilt angle necessary to counteract an overturning moment exerted on the target vehicle during movement of the ADAS testing platform around a corner.

4. The target vehicle of claim 2, wherein the sensor is an accelerometer configured to measure lateral acceleration of the target vehicle.

5. The target vehicle of claim 4, wherein the control unit is configured to maintain the simulation tilt angle at which the lateral acceleration measured by the accelerometer is minimized.

6. A target assembly comprising a testing platform onto which the target vehicle of claim 1 is mounted.

7. The target assembly of claim 6, wherein the base is removably secured to the testing platform.

8. A two-wheeled target vehicle to mount onto an Advanced Driver Assistance System (ADAS) testing platform, the two-wheeled target vehicle being arranged to simulate a tilt of a two-wheeled vehicle during cornering, the two-wheeled target vehicle comprising:
 a sensor arranged to measure a parameter relating to dynamics of the two-wheeled target vehicle as the two-wheeled target vehicle is moved by the ADAS testing platform;
 an actuation assembly arranged to adjust a tilt of a tiltable body of the two-wheeled target vehicle relative to a base of the two-wheeled target vehicle, the actuation assembly comprising:
  a rotary actuator, the rotary actuator being oriented along a fore-aft direction of the two-wheeled target vehicle,
  a pinion driven by the rotary actuator,
  a rack, wherein the rack is a toothed belt, the toothed belt being fastened at either end to the base at respective end fixings, and
  two idler gears mounted on lateral arms extending from the tiltable body,
  wherein the pinion is engaged with the rack, and the rack runs around the two idler gears, such that rotation of the pinion moves the pinion and the two idler gears along the rack, relative to the end fixings, to tilt the tiltable body; and
 a control unit configured to control the actuation assembly to adopt a simulation tilt angle, a magnitude of the simulation tilt angle being dependent on an output of the sensor,
 wherein the sensor, control unit, and actuation assembly are self-contained within the two-wheeled target vehicle and are independent of the ADAS testing platform to which the two-wheeled target vehicle is mounted.

9. A target assembly comprising a testing platform onto which the two-wheeled target vehicle of claim 8 is mounted.

10. The two-wheeled target vehicle of claim 8, wherein the magnitude of the simulation tilt angle minimizes a lateral acceleration experienced by the tiltable body, the lateral acceleration being the parameter relating to dynamics of the two-wheeled target vehicle.

11. An assembly to tilt a target vehicle, the assembly comprising:
 a sensor to attach to the target vehicle to measure a parameter relating to dynamics of the target vehicle;
 an actuation assembly arranged to adjust a tilt of a tiltable body of the target vehicle relative to a base of the target vehicle, the tilt being in dependence on an output of the sensor, the actuation assembly comprising:
  a rotary actuator, the rotary actuator being oriented along a fore-aft direction of the target vehicle,
  a pinion driven by the rotary actuator,
  a rack, wherein the rack is a toothed belt, the toothed belt being fastened at either end to the base at respective end fixings, and
  two idler gears mounted on lateral arms extending from the tiltable body,
  wherein the pinion is engaged with the rack, and the rack runs around the two idler gears, such that rotation of the pinion moves the pinion and the two idler gears along the rack, relative to the end fixings, to tilt the tiltable body; and
 a control unit configured to control the actuation assembly to adopt a simulation tilt angle, a magnitude of the simulation tilt angle being dependent on an output of the sensor.

12. A method of modeling a Vulnerable Road User (VRU) for Advanced Driver Assistance System (ADAS) testing using a target vehicle mounted on a moveable testing platform, the method comprising:
 measuring a parameter relating to dynamics of the target vehicle; and
 adjusting a tilt of a tiltable body of the target vehicle relative to a base of the target vehicle using an actuation assembly, the tilt being in dependence on an output of a sensor,
 wherein the actuation assembly comprises:
  a rotary actuator, the rotary actuator being oriented along a fore-aft direction of the target vehicle,
  a pinion driven by the rotary actuator,
  a rack, wherein the rack is a toothed belt, the toothed belt being fastened at either end to the base at respective end fixings, and
  two idler gears mounted on lateral arms extending from the tiltable body,
 wherein the pinion is engaged with the rack, and the rack runs around the two idler gears, such that rotation of the pinion moves the pinion and the two idler gears along the rack, relative to the end fixings, to tilt the tiltable body, and
 wherein the measuring the parameter and adjusting the tilt are conducted remotely from the moveable testing platform.

13. The method of claim 12, wherein the measuring the parameter and adjusting the tilt take place in the target vehicle.

14. A target assembly comprising a testing platform and a target vehicle mounted thereon, the target assembly comprising:
 a sensor arranged to measure a parameter relating to dynamics of the target assembly; and
 an actuation assembly arranged to adjust a tilt of the target vehicle in dependence on an output of the sensor, the target vehicle comprising a tiltable body to tilt relative to a base of the target vehicle, the actuation assembly comprising:
  a rotary actuator, the rotary actuator being oriented along a fore-aft direction of the target vehicle,
  a pinion driven by the rotary actuator,
  a rack, wherein the rack is a toothed belt, the toothed belt being fastened at either end to the base at respective end fixings, and
  two idler gears mounted on lateral arms extending from the tiltable body,
 wherein the pinion is engaged with the rack, and the rack runs around the two idler gears, such that rotation of the pinion moves the pinion and the two idler gears along the rack, relative to the end fixings, to tilt the target vehicle.

15. The target assembly of claim 14, wherein the sensor is in the testing platform and the target assembly comprises a communication module to communicate signals between the testing platform and the target vehicle.

16. The target assembly of claim 14, wherein the output of the sensor is configured to control the testing platform.

17. The target assembly of claim 14, wherein the sensor is arranged along a vertical axis of the target vehicle.

* * * * *